United States Patent
Jelinek et al.

(10) Patent No.: US 7,933,507 B2
(45) Date of Patent: Apr. 26, 2011

(54) SINGLE LENS SPLITTER CAMERA

(75) Inventors: Jan Jelinek, Plymouth, MN (US);
Thomas Phinney, Glendale, AZ (US)

(73) Assignee: Honeywell International Inc.,
Morristown, NJ (US)

(*) Notice: Subject to any disclaimer, the term of this patent is extended or adjusted under 35 U.S.C. 154(b) by 191 days.

(21) Appl. No.: 11/681,505

(22) Filed: Mar. 2, 2007

(65) Prior Publication Data
US 2008/0075441 A1 Mar. 27, 2008

Related U.S. Application Data

(63) Continuation-in-part of application No. 11/382,373, filed on May 9, 2006.

(60) Provisional application No. 60/778,770, filed on Mar. 3, 2006, provisional application No. 60/807,046, filed on Jul. 11, 2006.

(51) Int. Cl.
*G03B 29/00* (2006.01)
*H04N 7/18* (2006.01)
*H04N 5/33* (2006.01)

(52) U.S. Cl. .............. 396/18; 348/78; 348/164

(58) Field of Classification Search .......... 396/77, 396/18, 51, 446; 359/353, 839; 348/342, 348/344, 78, 162, 164
See application file for complete search history.

(56) References Cited

U.S. PATENT DOCUMENTS

| 4,641,349 A | 2/1987 | Flom et al. |
|---|---|---|
| 4,836,670 A * | 6/1989 | Hutchinson .............. 351/210 |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |

(Continued)

FOREIGN PATENT DOCUMENTS

EP 0484076 5/1992

(Continued)

OTHER PUBLICATIONS

Bonney et al., "Iris Pattern Extraction Using Bit Planes and Standard Deviations," IEEE, pp. 582-586, 2004.
Camus et al., "Reliable and Fast Eye Finding in Close-up Images," IEEE, pp. 389-394, 2002.
Cui et al., "A Fast and Robust Iris Localization Method Based on Texture Segmentation," 8 pages, 2004.

(Continued)

*Primary Examiner* — W. B. Perkey
*Assistant Examiner* — Noam Reisner
(74) *Attorney, Agent, or Firm* — Seager, Tufte & Wickhem LLC (57) ABSTRACT

A camera system may be used to capture iris images of targeted people who may be unaware of being targeted and hence their movement may not be constrained in any way. Iris images may be used for identification and/or tracking of people. In one illustrative embodiment, a camera system may include a focus camera and an iris camera, where the focus camera is sensitive to ambient light or some spectrum thereof, and the iris camera is sensitive to infrared or some other wavelength light. The focus camera and the iris camera may share an optical lens, and the focus camera may be used to auto-focus the lens on a focus target. A beam splitter or other optical element may be used to direct light of some wavelengths to the focus camera for auto-focusing the lens, and other wavelengths to the iris camera for image capture of the iris images.

18 Claims, 7 Drawing Sheets

U.S. PATENT DOCUMENTS

| | | |
|---|---|---|
| 5,572,596 A | 11/1996 | Wildes et al. |
| 5,608,472 A | 3/1997 | Szirth et al. |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,896,174 A | 4/1999 | Nakata |
| 5,901,238 A | 5/1999 | Matsushita |
| 5,909,269 A * | 6/1999 | Isogai et al. .................. 351/208 |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 * | 5/2002 | Amir et al. .................. 382/103 |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,879 B2 | 1/2005 | Lee et al. |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 7,053,948 B2 | 5/2006 | Konishi |
| 7,071,971 B2 | 7/2006 | Elberbaum |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,277,891 B2 | 10/2007 | Howard et al. |
| 7,298,873 B2 | 11/2007 | Miller, Jr. et al. |
| 7,315,233 B2 * | 1/2008 | Yuhara .................. 340/5.72 |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 * | 4/2008 | Kahn et al. ............... 348/207.99 |
| 7,406,184 B2 * | 7/2008 | Wolff et al. .................. 382/118 |
| 7,414,648 B2 * | 8/2008 | Imada ...................... 348/208.12 |
| 7,443,441 B2 | 10/2008 | Hiraoka |
| 7,518,651 B2 | 4/2009 | Butterworth |
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |

| | | |
|---|---|---|
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessler |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0219902 A1 | 11/2004 | Lee et al. |
| 2004/0233038 A1 | 11/2004 | Beenau et al. |
| 2004/0240711 A1 | 12/2004 | Hamza et al. |
| 2004/0252866 A1 | 12/2004 | Tisse et al. |
| 2004/0255168 A1 | 12/2004 | Murashita et al. |
| 2005/0008200 A1 | 1/2005 | Azuma et al. |
| 2005/0008201 A1 | 1/2005 | Lee et al. |
| 2005/0012817 A1 | 1/2005 | Hampapur et al. |
| 2005/0012843 A1* | 1/2005 | Kuwakino et al. ............ 348/335 |
| 2005/0029353 A1 | 2/2005 | Isemura et al. |
| 2005/0031325 A1* | 2/2005 | Fujii ............................... 396/54 |
| 2005/0052506 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0099288 A1 | 5/2005 | Spitz et al. |
| 2005/0102502 A1 | 5/2005 | Sagen |
| 2005/0110610 A1 | 5/2005 | Bazakos et al. |

| | | | | | |
|---|---|---|---|---|---|
| 2005/0125258 A1 | 6/2005 | Yellin et al. | JP | 10137222 | 5/1998 |
| 2005/0127161 A1 | 6/2005 | Smith et al. | JP | 10137223 | 5/1998 |
| 2005/0129286 A1 | 6/2005 | Hekimian | JP | 10248827 | 9/1998 |
| 2005/0134796 A1 | 6/2005 | Zelvin et al. | JP | 10269183 | 10/1998 |
| 2005/0138385 A1 | 6/2005 | Friedli et al. | JP | 11047117 | 2/1999 |
| 2005/0138387 A1 | 6/2005 | Lam et al. | JP | 11089820 | 4/1999 |
| 2005/0146640 A1 | 7/2005 | Shibata | JP | 11200684 | 7/1999 |
| 2005/0151620 A1 | 7/2005 | Neumann | JP | 11203478 | 7/1999 |
| 2005/0152583 A1 | 7/2005 | Kondo et al. | JP | 11213047 | 8/1999 |
| 2005/0193212 A1 | 9/2005 | Yuhara | JP | 11339037 | 12/1999 |
| 2005/0199708 A1 | 9/2005 | Friedman | JP | 2000005149 | 1/2000 |
| 2005/0206501 A1 | 9/2005 | Farhat | JP | 2000005150 | 1/2000 |
| 2005/0206502 A1 | 9/2005 | Bernitz | JP | 2000011163 | 1/2000 |
| 2005/0207614 A1 | 9/2005 | Schonberg et al. | JP | 2000023946 | 1/2000 |
| 2005/0210267 A1 | 9/2005 | Sugano et al. | JP | 2000083930 | 3/2000 |
| 2005/0210270 A1 | 9/2005 | Rohatgi et al. | JP | 2000102510 | 4/2000 |
| 2005/0210271 A1 | 9/2005 | Chou et al. | JP | 2000102524 | 4/2000 |
| 2005/0238214 A1 | 10/2005 | Matsuda et al. | JP | 2000105830 | 4/2000 |
| 2005/0240778 A1 | 10/2005 | Saito | JP | 2000107156 | 4/2000 |
| 2005/0248725 A1 | 11/2005 | Ikoma et al. | JP | 2000139878 | 5/2000 |
| 2005/0249385 A1 | 11/2005 | Kondo et al. | JP | 2000155863 | 6/2000 |
| 2005/0255840 A1 | 11/2005 | Markham | JP | 2000182050 | 6/2000 |
| 2006/0093190 A1 | 5/2006 | Cheng et al. | JP | 2000185031 | 7/2000 |
| 2006/0147094 A1 | 7/2006 | Yoo | JP | 2000194972 | 7/2000 |
| 2006/0165266 A1 | 7/2006 | Hamza | JP | 2000237167 | 9/2000 |
| 2006/0274919 A1 | 12/2006 | LoIacono et al. | JP | 2000242788 | 9/2000 |
| 2007/0036397 A1 | 2/2007 | Hamza | JP | 2000259817 | 9/2000 |
| 2007/0140531 A1 | 6/2007 | Hamza | JP | 2000356059 | 12/2000 |
| 2007/0160266 A1 | 7/2007 | Jones et al. | JP | 2000357232 | 12/2000 |
| 2007/0189582 A1 | 8/2007 | Hamza et al. | JP | 2001005948 | 1/2001 |
| 2007/0206840 A1 | 9/2007 | Jacobson | JP | 2001067399 | 3/2001 |
| 2007/0211924 A1 | 9/2007 | Hamza | JP | 2001101429 | 4/2001 |
| 2007/0274570 A1 | 11/2007 | Hamza | JP | 2001167275 | 6/2001 |
| 2007/0274571 A1 | 11/2007 | Hamza | JP | 2001222661 | 8/2001 |
| 2007/0286590 A1 | 12/2007 | Terashima | JP | 2001292981 | 10/2001 |
| 2008/0005578 A1 | 1/2008 | Shafir | JP | 2001297177 | 10/2001 |
| 2008/0075441 A1 | 3/2008 | Jelinek et al. | JP | 2001358987 | 12/2001 |
| 2008/0211347 A1 | 9/2008 | Wright et al. | JP | 2002119477 | 4/2002 |
| 2008/0252412 A1 | 10/2008 | Larsson et al. | JP | 2002133415 | 5/2002 |
| 2009/0092283 A1 | 4/2009 | Whillock et al. | JP | 2002153444 | 5/2002 |
| 2009/0316993 A1 | 12/2009 | Brasnett et al. | JP | 2002153445 | 5/2002 |
| 2010/0033677 A1 | 2/2010 | Jelinek | JP | 2002260071 | 9/2002 |
| 2010/0034529 A1 | 2/2010 | Jelinek | JP | 2002271689 | 9/2002 |
| 2010/0182440 A1 | 7/2010 | McCloskey | JP | 2002286650 | 10/2002 |
| 2010/0239119 A1 | 9/2010 | Bazakos et al. | JP | 2002312772 | 10/2002 |
| | | | JP | 2002329204 | 11/2002 |

FOREIGN PATENT DOCUMENTS

| | | | | | |
|---|---|---|---|---|---|
| | | | JP | 2003006628 | 1/2003 |
| EP | 0593386 | 4/1994 | JP | 2003036434 | 2/2003 |
| EP | 0878780 | 11/1998 | JP | 2003108720 | 4/2003 |
| EP | 0899680 | 3/1999 | JP | 2003108983 | 4/2003 |
| EP | 0910986 | 4/1999 | JP | 2003132355 | 5/2003 |
| EP | 0962894 | 12/1999 | JP | 2003150942 | 5/2003 |
| EP | 1018297 | 7/2000 | JP | 2003153880 | 5/2003 |
| EP | 1024463 | 8/2000 | JP | 2003242125 | 8/2003 |
| EP | 1028398 | 8/2000 | JP | 2003271565 | 9/2003 |
| EP | 1041506 | 10/2000 | JP | 2003271940 | 9/2003 |
| EP | 1041523 | 10/2000 | JP | 2003308522 | 10/2003 |
| EP | 1126403 | 8/2001 | JP | 2003308523 | 10/2003 |
| EP | 1139270 | 10/2001 | JP | 2003317102 | 11/2003 |
| EP | 1237117 | 9/2002 | JP | 2003331265 | 11/2003 |
| EP | 1477925 | 11/2004 | JP | 2004005167 | 1/2004 |
| EP | 1635307 | 3/2006 | JP | 2004021406 | 1/2004 |
| GB | 2369205 | 5/2002 | JP | 2004030334 | 1/2004 |
| GB | 2371396 | 7/2002 | JP | 2004038305 | 2/2004 |
| GB | 2375913 | 11/2002 | JP | 2004094575 | 3/2004 |
| GB | 2402840 | 12/2004 | JP | 2004152046 | 5/2004 |
| GB | 2411980 | 9/2005 | JP | 2004163356 | 6/2004 |
| JP | 9161135 | 6/1997 | JP | 2004164483 | 6/2004 |
| JP | 9198545 | 7/1997 | JP | 2004171350 | 6/2004 |
| JP | 9201348 | 8/1997 | JP | 2004171602 | 6/2004 |
| JP | 9147233 | 9/1997 | JP | 2004206444 | 7/2004 |
| JP | 9234264 | 9/1997 | JP | 2004220376 | 8/2004 |
| JP | 9305765 | 11/1997 | JP | 2004261515 | 9/2004 |
| JP | 9319927 | 12/1997 | JP | 2004280221 | 10/2004 |
| JP | 10021392 | 1/1998 | JP | 2004280547 | 10/2004 |
| JP | 10040386 | 2/1998 | JP | 2004287621 | 10/2004 |
| JP | 10049728 | 2/1998 | JP | 2004315127 | 11/2004 |
| JP | 10137219 | 5/1998 | JP | 2004318248 | 11/2004 |
| JP | 10137221 | 5/1998 | JP | 2005004524 | 1/2005 |

| | | |
|---|---|---|
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | 0128476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | 0219030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | 2005008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 05/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 06/012645 | 2/2006 |
| WO | WO 2006/023046 | 3/2006 |
| WO | WO 06/051462 | 5/2006 |
| WO | 2006063076 | 6/2006 |
| WO | WO 06/081209 | 8/2006 |
| WO | WO 06/081505 | 8/2006 |
| WO | WO 07/101269 | 9/2007 |
| WO | WO 07/101275 | 9/2007 |
| WO | WO 07/101276 | 9/2007 |
| WO | WO 07/103698 | 9/2007 |
| WO | WO 07/103701 | 9/2007 |
| WO | WO 07/103833 | 9/2007 |
| WO | WO 07/103834 | 9/2007 |
| WO | WO 08/016724 | 2/2008 |
| WO | WO 08/019168 | 2/2008 |
| WO | WO 08/019169 | 2/2008 |
| WO | WO 08/021584 | 2/2008 |
| WO | WO 08/031089 | 3/2008 |
| WO | WO 08/040026 | 4/2008 |

OTHER PUBLICATIONS

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

Jalaja et al., "Texture Element Feature Characterizations for CBIR," IEEE, pp. 733-736, 2005.

Kalka et al., "Image Quality Assessment for Iris Biometric," Proc. Of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

AOptix Technologies, "Introducing the AOptix InSight 2 Meter Iris Recognition System," 6 pages, 2010.

Belhumeur et al., "Eigenfaces vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun.11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al. "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database S stems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_ transform, "Radon Transform," 5 pages, printed May 14, 2010.

Ivins et al., "A Deformable Model of the Human Iris for Measuring Small Three-Dimensional Eye Movements," Machine Vision and Applications, vol. 11, p.. 42-51, 1998.

Kadyrov et al., "The Trace Transform and Its Applications," IEEE Transactions on Pattern Analysis and Machine Intellitence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication $5^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., "Pages 556-559 in Book Entitled "Computer Vision, Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

\* cited by examiner

SINGLE LENS SPLITTER CAMERA

This application claims the benefit of U.S. Provisional Application No. 60/778,770, filed Mar. 3, 2006, and U.S. Provisional Application No. 60/807,046, filed Jul. 11, 2006. This application is also a continuation-in-part of U.S. patent application Ser. No. 11/382,373, filed May 9, 2006. Each of these applications is hereby incorporated by reference.

RELATED APPLICATIONS

This application is related to U.S. patent application Ser. No. 10/979,129, filed Nov. 3, 2004, U.S. patent application Ser. No. 10/655,124, filed Sep. 5, 2003, now U.S. Pat. No. 7,183,895, U.S. patent application Ser. No. 11/275,703, filed Jan. 25, 2006, U.S. Provisional Application No. 60/647,270, filed Jan. 26, 2005, U.S. patent application Ser. No. 11/043,366, filed Jan. 26, 2005, U.S. patent application Ser. No. 11/372,854, filed Mar. 10, 2006, U.S. patent application Ser. No. 11/672,108, filed Feb. 7, 2007, and U.S. patent application Ser. No. 11/675,424, filed Feb. 15, 2007, all of which are hereby incorporated by reference.

The government may have rights in the invention.

TECHNICAL FIELD

The invention pertains generally to cameras and relates more particularly to cameras and camera systems that are configured to find and track facial features.

BACKGROUND

In some applications, it may be desirable to identify individuals from a distance, perhaps with the individual unaware that they are being watched or identified. In some cases, the individual may be standing still, or they may be moving. One way of identifying people is by imaging their eyes, or at least the iris portion of their eyes. There is a need for a camera system that is capable of obtaining high quality iris images.

SUMMARY

The present invention relates generally to structure and methods that provide high quality iris images that may be used for identification and/or tracking of people. In some instances, a camera system may include a focus camera and an iris camera. In some cases, the focus camera may be sensitive to ambient light or some spectrum thereof, while the iris camera may be sensitive to infrared or other spectrum of light. The focus camera and the iris camera may share an optical path that includes one or more lens that capture light, as well as a beam splitter or other optical element that directs light of some wavelengths to the focus camera and allows other wavelengths to reach the iris camera.

BRIEF DESCRIPTION OF THE FIGURES

The above summary of the present invention is not intended to describe each disclosed embodiment or every implementation of the present invention. The Figures, Detailed Description and Examples which follow more particularly exemplify these embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
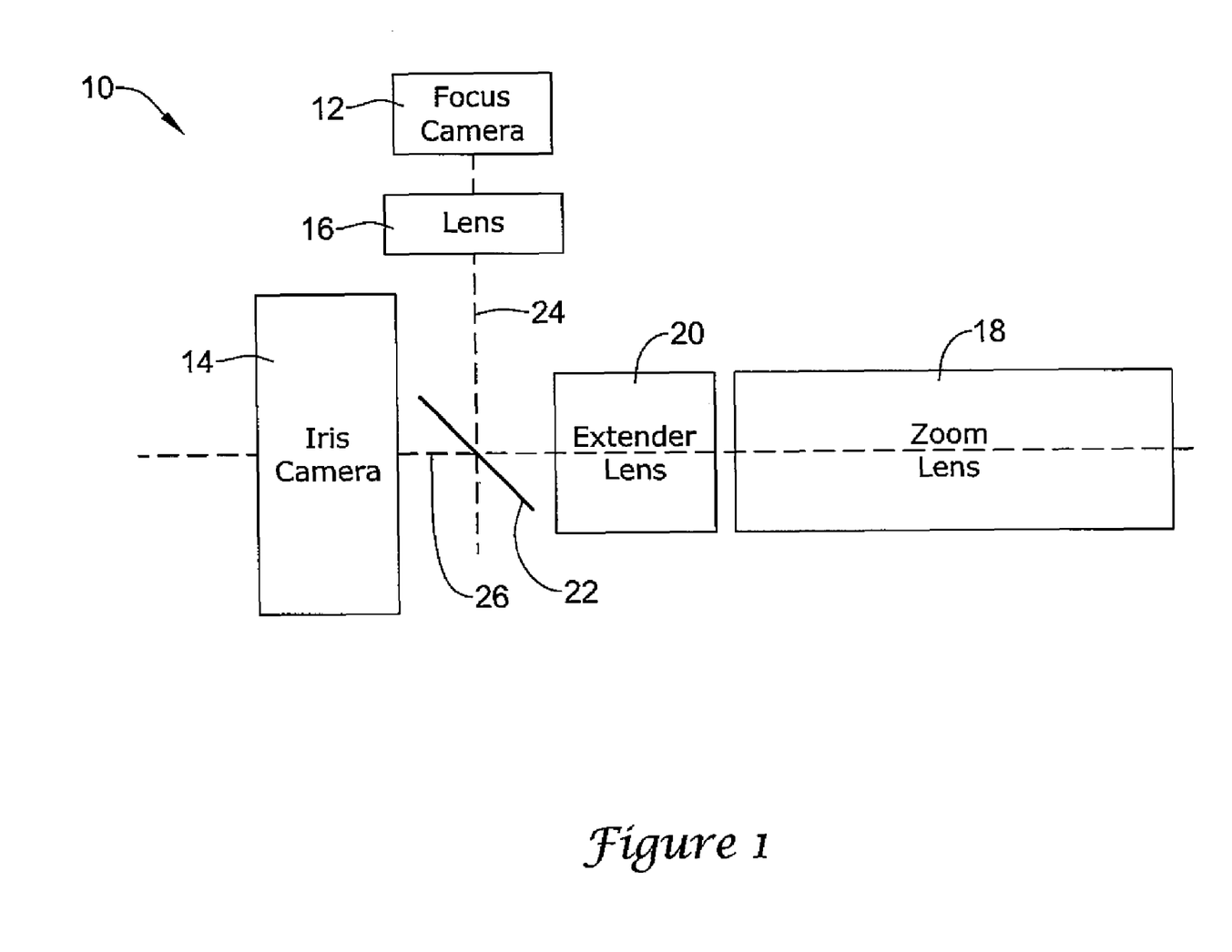
FIG. 1 is a schematic illustration of an exemplary camera system in accordance with an example of the present invention.

FIG. 1 provides an illustrative but non-limiting example of a camera system 10. Camera system 10 may include a focus camera 12 and an iris camera 14. In some instances, focus camera 12 may have a considerably lower resolution than iris camera 14, but this is not required. A lens 16 may be used to provide focus camera 12 with a field of view that is similar to a field of view of iris camera 14. In some cases, lens 16 may be excluded, depending on the particular specification and/or configuration of the focus camera 12 and/or the iris camera 14.

In some cases, focus camera 12 may be sensitive to ambient light or some spectrum thereof. Focus camera 12 may be any suitable camera that has a sufficiently high frame rate and sensitivity to perform an auto-focusing function, such as, for example a PixeLink PL-A741 camera. It will be recognized that having a relatively high frame rate may mean that focus camera 12 may have a relatively lower resolution, but this is not always the case. In some cases, focus camera 12 may have a frame rate of at least about 100 frames per second, or a frame every 10 milliseconds.

It is contemplated that iris camera 14 may be any suitable camera that is capable of acquiring an iris image in a desired light spectrum and with a desired quality, such as, for example, a REDLAKE ES11000® or a ES16000 digital camera. The light spectra used may include, but are not limited to, visible and infrared wavelengths. The desired image quality may depend on an intended security application. For example, higher security level applications typically require higher image quality. The image quality is typically dependent on the entire optical path including both the camera and its optics. For some applications, the minimum iris image quality for various security levels is defined in ANSI standard INCITS M1/03-0590.

Camera system 10 may include a lens 18 and optionally an extender lens 20. While a single lens 18 and a single extender lens 20 are illustrated, it will be recognized that in some applications, depending for example on a distance between camera system 10 and a possible subject, or perhaps depending at least in part on the particular optics of lens 18 and/or extender lens 20, two or more lens 18 and/or two or more extender lens 20 may be deployed, as desired. Lens 18 and/or extender lens 20 may be configured to provide any desired degree of magnification.

A beam splitter 22 or other optical element may be deployed downstream of lens 18 and extender lens 20. Beam splitter 22 may be a glass beam splitter, for example, and may be configured to permit some wavelengths of light to pass straight through while other wavelengths of light are deflected at an angle as shown. In some instances, beam splitter 22 may be configured to permit infrared light such as near infrared light (about 700 to about 900 nanometers) to pass through beam splitter 22 towards iris camera 14 while deflecting visible light (about 400 to about 700 nanometers) or some spectrum thereof towards focus camera 12.

As a result, focus camera 12 and iris camera 14 may see the same image, albeit in different wavelengths, and may be considered as sharing an optical path, i.e., through lens 18 and/or extender lens 20. Focus camera 12 may be considered as having an optical axis 24 while iris camera 14 may be considered as having an optical axis 26. In some cases, optical axis 24 is perpendicular or at least substantially perpendicular to optical axis 26, but this is not required. Rather, this may be a feature of the optical properties of beam splitter 22. In some instances, zoom lens 18 and extender 20 may be considered as being disposed along optical axis 26. In some cases, beam splitter 22 may be disposed at or near an intersection of optical axis 24 and optical axis 26, but this is not required.

Focus camera 12 may be used to move a focus lens that is part of lens 18 and that is used to focus it. Since focus camera 12 and iris camera 14 see the same image, by virtue of their common optical path, it will be recognized that focusing lens 18 via focus camera 12 may provide an initial focusing for iris camera 14, under ambient lighting conditions. In some cases, focus camera 12 may move the focus lens within lens 18 using one or more servo motors under the control of any suitable auto-focusing algorithm, as is known in the art. In some cases, a controller (not shown in FIG. 1) may orchestrate the auto-focusing operation.

Because light of differing wavelengths are refracted differently as they pass through particular materials (glass lenses and the like, for example), focusing lens 18 via one wavelength of light may not provide a precise focus for iris camera 14 at another wavelength of light. In some cases, it may be useful to calculate or otherwise determine a correction factor that may be used to correct the focus of lens 18 after lens 18 has been auto-focused using the focus camera 12, but before the iris camera 14 captures an image. Details regarding one such a correction can be found in, for example, patent application Ser. No. 11/681,251, filed Mar. 2, 2007, entitled CAMERA WITH AUTO FOCUS. This application is incorporated by reference in its entirety.

Figure 2:
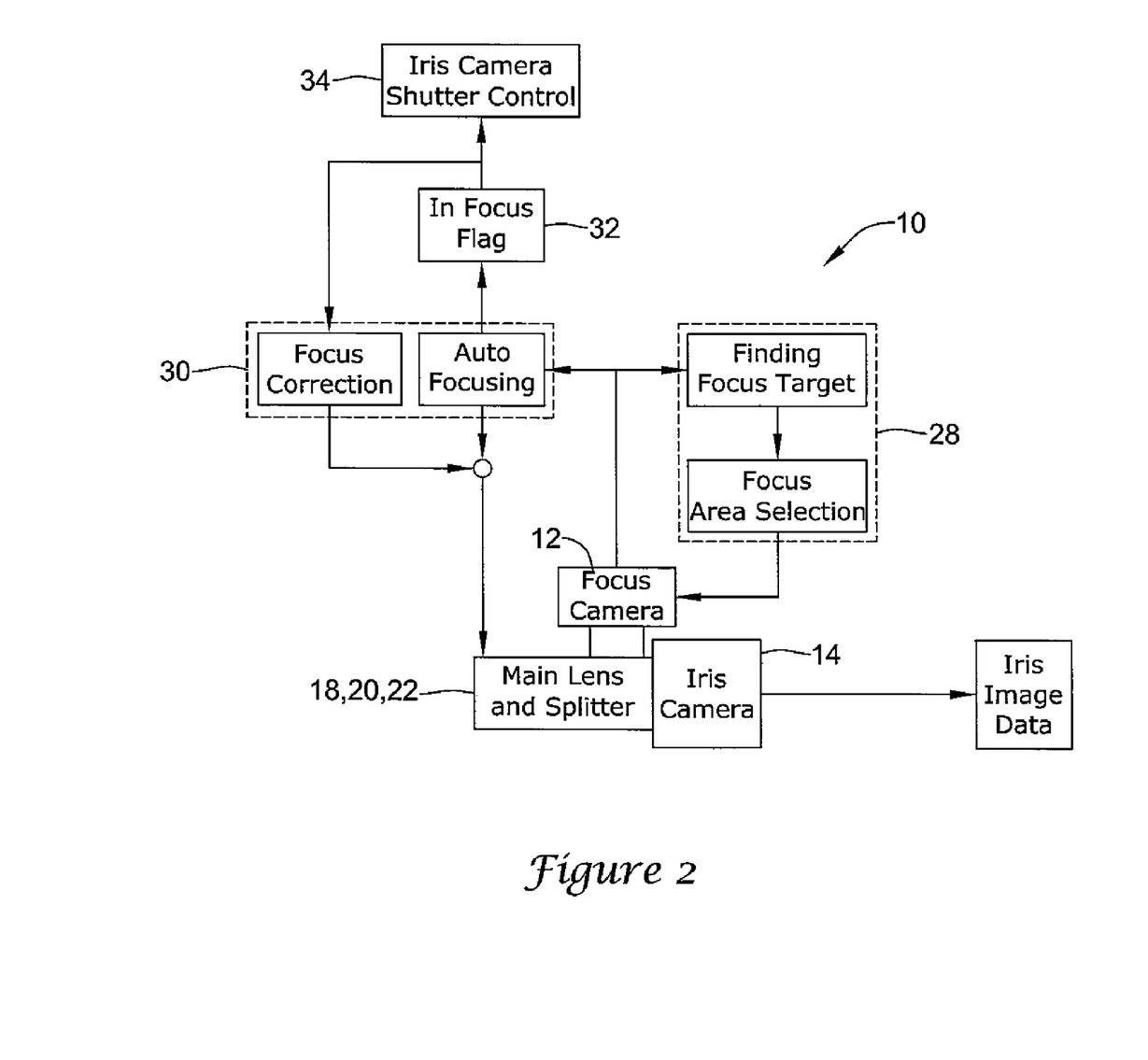
FIG. 2 is a schematic illustration of how particular elements of the camera system of FIG. 1 support an iris camera.

FIG. 2 is another schematic illustration of camera system 10, showing some of the functions and interactions of the individual components of camera system 10. Focus camera 12 may perform several tasks, including for example, finding a focus target point (generally indicated at reference number 28) and auto focusing (generally indicated at reference number 30).

Once camera system 12 is pointed at a face, the focus camera 12 (or a separate controller or the like) is tasked with finding a focus target within an image seen or sensed by focus camera 12. In some cases, the focus target may be a predefined point on the focus target, such as a predefined specific point on a face such as an eye pupil or the nose bridge. Once the focus target is located at functionality 28 and focus camera 12 is precisely autofocused on it via functionality 30, it may be necessary to provide a focus correction pertaining to the difference in focal length between the ambient light or some spectrum thereof used to auto-focus the lens, and the wavelength(s) to be captured by the iris camera, as indicated at 30. If/when the subject moves, such as by walking, bending, turning their head, and the like, focus camera 12 may be tasked to focus lens 18 in an ongoing process. Once focus has been achieved, camera system 10 may provide an in-focus flag 32 to initiate iris camera shutter control 34, and in some case, a flash controller.

Figure 3:
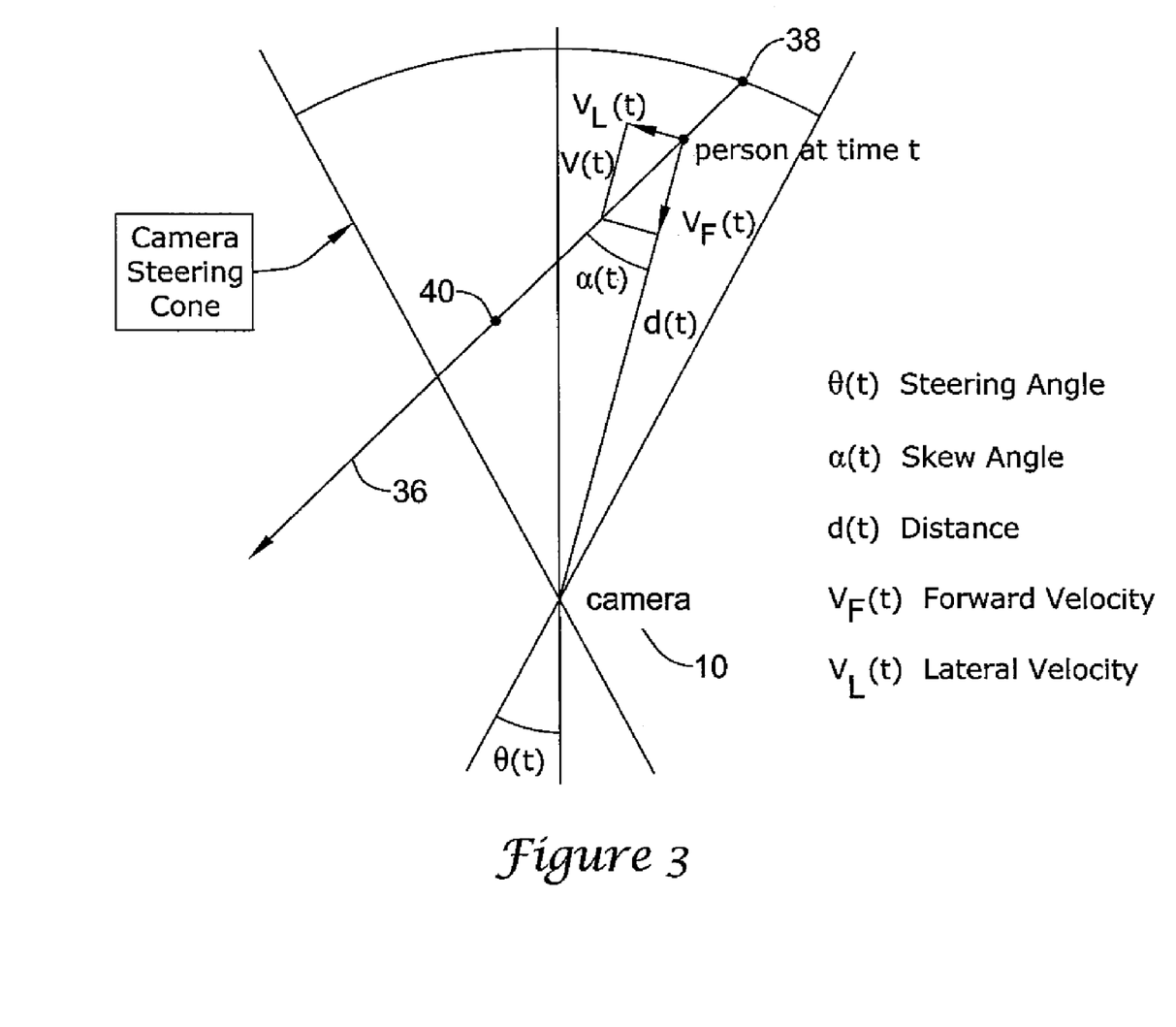
FIG. 3 is a schematic illustration showing how subject movement may be monitored.

In some cases, camera system 10 may be deployed in a position that permits detection and identification of people who are standing or walking in a particular location such as a hallway, airport concourse, and the like. FIG. 3 is a diagram showing how camera system 10 may track a moving individual. In this drawing, an individual is walking or otherwise moving along walking path 36, in a direction from upper right to lower left. Camera system 10 locks onto the individual at point 38 and is able to track the individual until they reach point 40. Camera system 10 may be configured to be able to lock onto and obtain sufficient iris images in the time between point 38 and point 40 to be able to identify the individual.

This illustration makes several assumptions. For example, a steering angle of plus or minus 22.5 degrees (or a total path width of about 45 degrees) has been assumed. It is assumed, for purposes of this illustration, that the individual is unaware of being identified and hence is being uncooperative. As a result, the individual happens to walk in a manner that increases the relative angle between the camera and the individual. The person is detected at a distance of about 2 to about 5 meters in this example.

Figure 4:
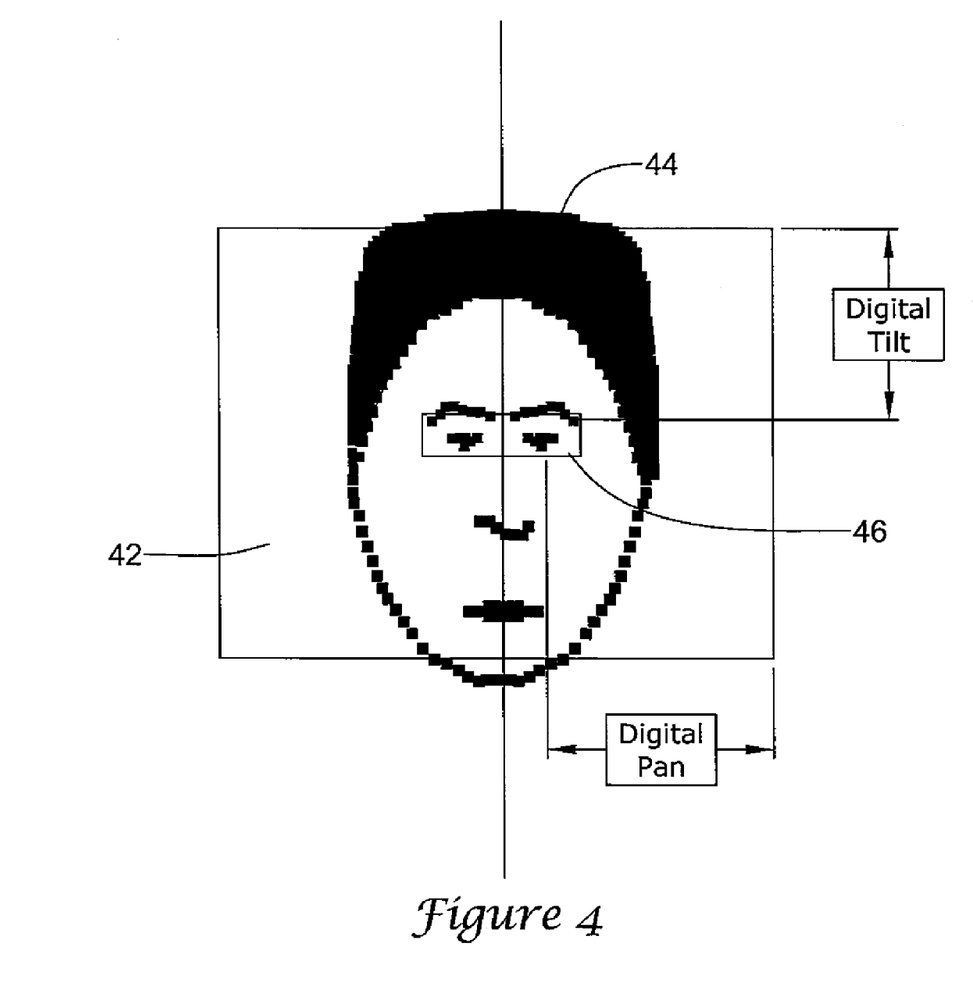
FIG. 4 is a schematic illustration showing how digital tilt and pan may be used to find and track an individual's irises.

FIG. 4 defines digital tilt and pan within a field of view of iris camera 14. In this example, iris camera 14 is capable of providing an image having about 11 megapixels. At a particular distance, iris camera 14 has a field of view that is indicated by box 42. Box 42 is in scale to an individual 44. A smaller box 46 shows the relative field of view necessary to view the individual's irises. It can be seen that unless the individual 44 moves excessively, iris camera 14 may digitally tilt and/or pan the image to track box 46 within larger box 42 without any need to mechanically adjust its physical pan and tilt. The specific numbers of FIG. 4 pertain to a particular system design parameter set that, according to the ANSI standard referenced above, is suitable for a lower security application.

It will be recognized that digital tilt and pan permit a camera to remain pointed at a face without requiring mechanical re-positioning as long as a desired portion of the image, such as a face or a portion of a face, remain within the viewable image. Because focus camera 12 and iris camera 14 have about the same field of view, they have about the same digital tilt and pan. A focus target algorithm finds the focus target (such as an eye pupil or nose bridge) within the focus camera image and then precisely focuses on it.

Figure 5:
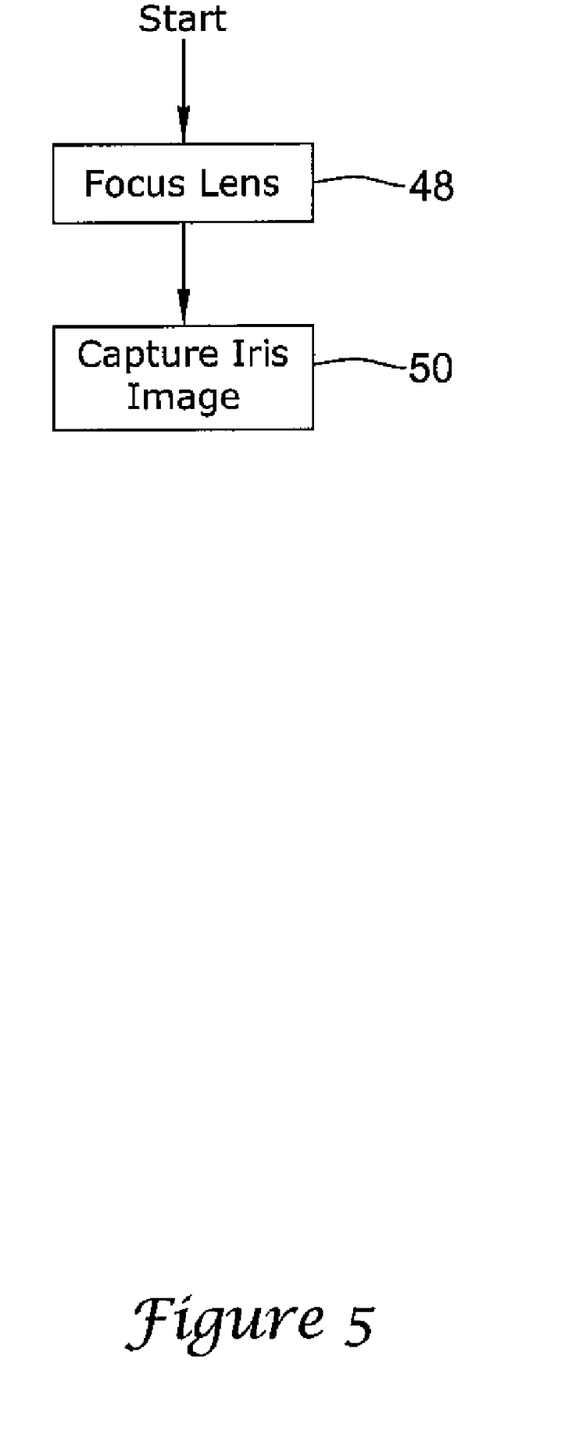
FIG. 5 is a flow diagram showing a method that may be carried out using the camera system of FIG. 1.

FIG. 5 is a flow diagram showing an illustrative but non-limiting method that may be carried out using camera system 10 (FIG. 1). At block 48, the lens is focused, often under ambient light or some spectrum thereof. In some instances, lens 18 (FIG. 1) may be focused via an iterative auto-focus algorithm using focus camera 12 (FIG. 1), sometimes under ambient lighting or some selected spectrum thereof. Control passes to block 50, where an iris image is captured. In some instances, an iris image may be captured using iris camera 14, which is timed with a flash that produces infrared light or any other light having a desired spectrum.

Figure 6:
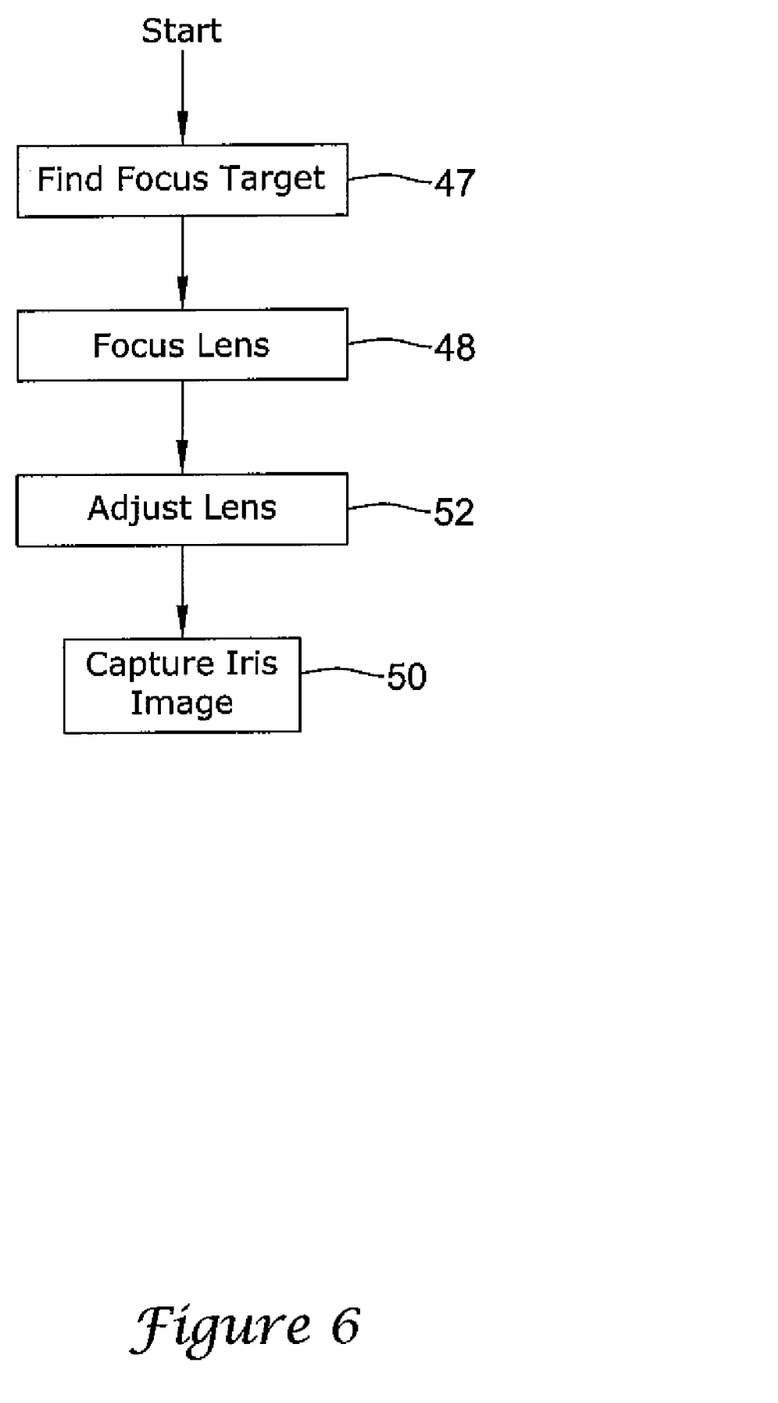
FIG. 6 is a flow diagram showing a method that may be carried out using the camera system of FIG. 1.

FIG. 6 is a flow diagram showing an illustrative but non-limiting method that may be carried out using camera system 10 (FIG. 1). At block 47, a focus target is located within a focus image. At block 48, the lens is focused at it. In some instances, lens 18 (FIG. 1) may be auto-focused via an iterative auto-focus algorithm using focus camera 12 (FIG. 1) under ambient lighting or some selected spectra thereof. Control is then passed to block 52, where the lens is adjusted. In some cases, the focus of lens 18 may be adjusted to correct for the differences between, for example, ambient and infrared light. Then, at block 50, an iris image is captured. In some instances, an iris image may be captured using iris camera 14, which is timed with a flash that produces infrared or any other desired light.

Figure 7:
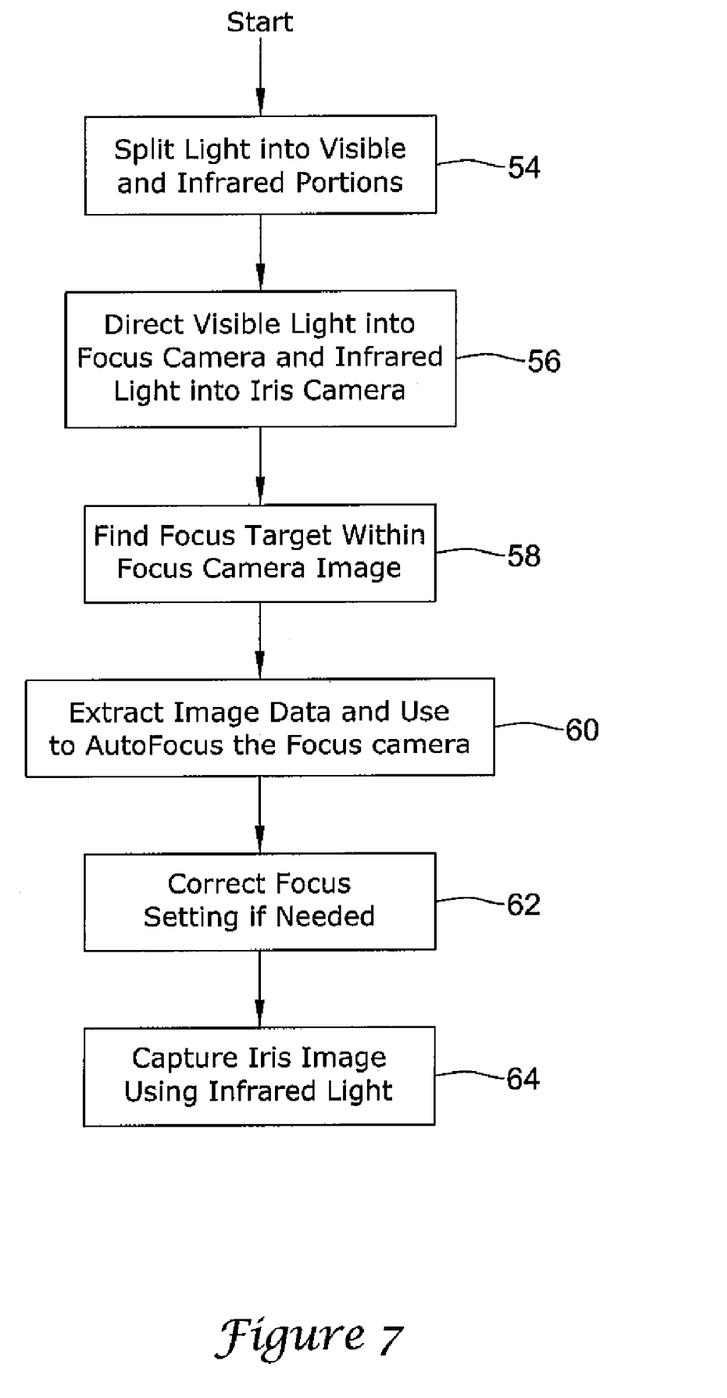
FIG. 7 is a flow diagram showing a method that may be carried out using the camera system of FIG. 1.

FIG. 7 is a flow diagram showing an illustrative but non-limiting method that may be carried out using camera system 10 (FIG. 1). At block 54, light that may be entering camera system 10 is split into an ambient light or some spectrum thereof and an infrared light portion. Control passes to block 56, where the ambient light portion is directed into or towards focus camera 12 (FIG. 1), and the infrared light portion is directed into or towards iris camera 14 (FIG. 1). In some cases, these steps may be achieved by beam splitter 22 (FIG. 1).

At block 58, a focus target is found within the focus camera image. Image data from a small area surrounding the focus target are extracted from the focus camera image at block 60, and the extracted data is used to precisely auto focus the focus camera 12. Control passes to block 62, where the focus setting is corrected, if necessary, for any differences between the light spectrum used for focusing and the light spectrum used for image acquisition by iris camera 14. Control passes to block 64, where an iris image is captured using, for example, infrared light sometimes aided by a flash discharge.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A camera system comprising:
   an iris camera having an optical axis, the iris camera configured to acquire iris images suitable for human identification;
   a focus camera having an optical axis, wherein the optical axis of the focus camera is angularly offset from the optical axis of the iris camera;
   an autofocus lens for receiving incoming light and for providing the incoming light to both the iris camera and the focus camera, wherein an output of the focus camera is used in auto-focusing the autofocus lens;
   a beam splitter arranged downstream of the autofocus lens, the beam splitter directing a first wavelength or range of wavelengths of the incoming light to the focus camera and a second wavelength or range of wavelengths of the incoming light to the iris camera; and
   a controller coupled to the iris camera and the autofocus lens, the controller configured to correct a focus setting of the autofocus lens to provide a focused image in the second wavelength or range of wavelengths to the iris camera after the output of the focus camera has been used to auto-focus the autofocus lens using the first wavelength or range of wavelengths of the incoming light, the controller further configured to activate the iris camera to capture an iris image of a subject that is suitable for human identification after the focus setting of the autofocus lens has been corrected.

2. The camera system of claim 1, wherein the optical axis of the focus camera is arranged at least substantially perpendicular to the optical axis of the iris camera.

3. The camera system of claim 1, wherein the beam splitter is configured to permit the second wavelength or range of wavelengths of incoming light to pass straight through the beam splitter.

4. The camera system of claim 1, wherein the first wavelength or range of wavelengths of light includes ambient light.

5. The camera system of claim 1, wherein the first wavelength or range of wavelengths of light includes visible light.

6. The camera system of claim 1, wherein the second wavelength or range of wavelengths of light includes flash illumination light.

7. The camera system of claim 1, wherein the second wavelength or range of wavelengths of light includes infrared light.

8. The camera system of claim 1, wherein the focus camera is sensitive to visible light or some sub spectra thereof.

9. The camera system of claim 1, wherein the iris camera is sensitive to infrared light or some sub spectra thereof.

10. The camera system of claim 1, wherein the output of the focus camera is used to locate a given focus target within the field of view of the focus camera.

11. The camera system of claim 10, wherein the output of the focus camera is used to auto-focus the lens on the focus target.

12. The camera system of claim 1, further comprising a near infrared flash that is controlled by the controller and is used in conjunction with the iris camera.

13. A camera system comprising:
    a lens;
    an auto-focus element for auto-focusing the lens;
    a first camera that is sensitive to ambient light, the first camera providing an output to the auto-focus element suitable for auto-focusing the lens onto a person of interest;
    a second camera that is sensitive to light from a flash discharge, the second camera capturing an infrared image of an iris of the person of interest suitable for human identification;
    a beam splitter disposed downstream of the lens, the beam splitter splitting the light passing through the lens into an ambient light image that is directed to the first camera, and a flash light image that is directed to the second camera;
    a controller configured to apply a correction factor to correct the focus of the lens so as to provide a focused image in infrared light to the second camera after the lens has been auto-focused using the output of the first camera that is sensitive to ambient light but before the second camera captures an infrared image of the iris; and
    wherein the lens, when corrected to provide a focused image in infrared light to the second camera does not provided a focused image in ambient light to the first camera.

14. A method of capturing an iris image of an iris of a person of interest using a camera system comprising a focus camera, an iris camera and a lens disposed upstream of and shared by the focus camera and the iris camera, the method comprising the steps of:
    finding a focus target in a focus camera image;
    focusing the lens on the focus target using the focus camera;
    modifying a focus setting of the lens to provide a focused image to the iris camera after the lens has been focused by the focus camera;
    once the focus setting has been modified, initiating iris camera shutter control; and
    capturing the iris image using the iris camera, wherein the iris image of the iris of the person of interest is suitable for human identification.

15. The method of claim 14, wherein the focus camera focuses the lens using ambient light or some spectra thereof.

16. The method of claim 14, further comprising a step of finding a focus target within an image seen or sensed by the focus camera.

17. The method of claim 16, further comprising a step of extracting image data and using the image data to precisely auto focus the focus camera.

18. The method of claim 14, further comprising the step of splitting the light that passes through the shared lens into an ambient light based image and an infrared light based image, wherein the ambient light based image is directed to the focus camera and the infrared light based image is directed to the iris camera.

* * * * *